(12) United States Patent
Rauch et al.

(10) Patent No.: US 10,780,626 B2
(45) Date of Patent: Sep. 22, 2020

(54) METHOD FOR MANUFACTURING A THREE-DIMENSIONAL PRODUCT

(71) Applicant: Robert Bosch GmbH, Stuttgart (DE)

(72) Inventors: Johannes Rauch, Neuendorf (DE); Benjamin Seitz, Calw Ernstmuehl (DE); Bertram Amrhein, Weibersbrunn (DE); Hannes Willeck, Renningen (DE); Lukas Loeber, Ludwigsburg (DE); Martin Schoepf, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 16/128,930

(22) Filed: Sep. 12, 2018

(65) Prior Publication Data

US 2019/0084218 A1 Mar. 21, 2019

(30) Foreign Application Priority Data

Sep. 20, 2017 (DE) .................. 10 2017 216 676

(51) Int. Cl.
| | | |
|---|---|---|
| *B29C 64/10* | (2017.01) | |
| *B22F 3/105* | (2006.01) | |
| *B33Y 10/00* | (2015.01) | |
| *B33Y 80/00* | (2015.01) | |
| *B29C 64/20* | (2017.01) | |
| *B22F 7/06* | (2006.01) | |
| *F15B 13/00* | (2006.01) | |
| *B22F 5/10* | (2006.01) | |
| *B22F 7/08* | (2006.01) | |

(52) U.S. Cl.
CPC ............ *B29C 64/10* (2017.08); *B22F 3/1055* (2013.01); *B29C 64/20* (2017.08); *B33Y 10/00* (2014.12); *B33Y 80/00* (2014.12); *B22F 5/106* (2013.01); *B22F 7/062* (2013.01); *B22F 7/08* (2013.01); *B22F 2999/00* (2013.01); *F15B 13/00* (2013.01)

(58) Field of Classification Search
CPC ......... B29C 64/10; B29C 64/20; B33Y 10/00; B33Y 80/00; F15B 13/00; F15B 13/04; F15B 13/0817; F15B 2211/615
See application file for complete search history.

(56) References Cited

U.S. PATENT DOCUMENTS

| 2014/0190942 | A1* | 7/2014 | Wescott | ............... | B22F 3/1055 |
|---|---|---|---|---|---|
| | | | | | 219/76.1 |
| 2014/0299091 | A1* | 10/2014 | Ribeiro | ................ | F02F 3/0084 |
| | | | | | 123/193.6 |

(Continued)

FOREIGN PATENT DOCUMENTS

WO 2014/199158 A1 12/2014

*Primary Examiner* — Chun Cao
(74) *Attorney, Agent, or Firm* — Norton Rose Fulbright US LLP; Gerard Messina

(57) ABSTRACT

A method is described for manufacturing a three-dimensional product, in particular a hydraulic element, the method encompassing at least the following method steps: Providing a first section of the product to be manufactured, which includes at least one first connection point for a second section of the product to be manufactured; and producing the second section by an additive manufacture in which the at least one first connection point of the first section is used as a substrate for the additive manufacture of the second section.

11 Claims, 1 Drawing Sheet

(56) References Cited

U.S. PATENT DOCUMENTS

| | | | |
|---|---|---|---|
| 2015/0224743 A1* | 8/2015 | Schick | B22F 3/1055 |
| | | | 428/615 |
| 2016/0160869 A1* | 6/2016 | Roach | F04D 29/023 |
| | | | 415/200 |
| 2018/0202270 A1* | 7/2018 | Falk | B23K 26/34 |
| 2018/0209283 A1* | 7/2018 | Kottilingam | F01D 9/041 |

* cited by examiner

METHOD FOR MANUFACTURING A THREE-DIMENSIONAL PRODUCT

BACKGROUND INFORMATION

Hydraulic components such as servo directional control valves are normally produced as a cast construction. Afterwards, these constructions are regularly reworked in a costly manner in a machining operation. More specifically, it is often necessary to drill fine fluid lines into the cast components. Fluid lines in the corresponding sizes and aspect ratios can often not be obtained by casting methods. In this context, the aspect ratio is the ratio of the length of the fluid line to the diameter of the fluid line. Instead, it is often necessary to produce fluid lines after the fact using cost-intensive production methods such as deep drilling, for example.

In addition to the high manufacturing expense, the design flexibility is severely restricted by the conventional production process. For example, the fluid conduits produced by the drilling methods can be reproduced only by bores that are cut in a straight line. This often results in a restricted design flexibility and/or in additional required sealing points as a result thereof. Another disadvantage of the conventional manufacture is the development of the ducts, which is less than optimal from the aspect of fluid dynamics. Among other things, cavitation and pressure-loss problems as well as losses in the dynamic response during a valve actuation may be the consequence. The complex function geometry of the described components requires a greater outlay also for structures that are able to be reproduced using casting technology. For instance, partially complex cores that require exact positioning are necessary. A high variant diversity of the individual models as well as inside lying structures and undercuts, which can be reproduced neither by machining nor casting technology, in some cases may require the subsequent additional tight joining of further geometrically complex components.

In addition, however, it is also known to manufacture hydraulic components in an additive manner. For instance, the document PCT Published Patent Application No. WO 2014/199158 A1 describes a manufacturing method for an elbow joint of a servo valve for which an additive manufacture is used. The additive manufacture can indeed overcome the afore-described disadvantages to some extent. However, the additive manufacturing process is usually much more complex than a casting process, for example, especially when a large volume of material must be applied.

SUMMARY

Here, a particularly advantageous method for manufacturing a three-dimensional product is introduced.

The described method lends itself particularly well to the manufacture of hydraulic elements such as components of pumps or valves, for example. Components of industrial hydraulics and mobile hydraulics, in particular, are able to be manufactured with the aid of the described method. For instance, the described method may be used in the manufacture of electrohydraulic servo directional control valves, especially for motor vehicles (mobile applications) as well as for stationary applications.

The described method in particular makes it possible to route ducts in the product to be manufactured in an optimal manner from the aspect of fluid dynamics. Complex manufacturing steps such as deep drilling and/or an assembly including the sealing of complex add-on parts are not required. There is also no need to use a particularly complex core.

The product to be manufactured is able to be produced by a novel manufacturing method using the described method. This particularly allows for a related constructive redesign of the product to be manufactured.

For this purpose, depending on the complexity of the product to be manufactured, the described method provides for a combination of conventional and novel additive manufacturing technologies. More specifically, the manufacture of the product to be manufactured may be accomplished with an improved functional design and/or without cost-intensive working steps, for example.

In the described method, this is able to be achieved by subdividing the functional geometry into subsections according to the complexity from the aspect of production technology. In the process, the product to be manufactured is subdivided into at least two sections (a first section and a second section).

In step a) of the described method, a first section of the product to be manufactured is provided, which includes at least one first connection point for a second section of the product to be produced.

Providing the first section may particularly include the production of the first section. However, it is also possible to use a first section that was produced outside the described method.

The first section may particularly be obtained by an especially cost-effective (or conventional) manufacturing method such as casting, forming or machining, for example.

In step b) of the described method, the second section is produced by an additive manufacture, in which the at least one first connection point of the first section is used as a substrate for the additive manufacture of the second section.

On the one hand, the use of the described method particularly makes it possible to exploit the fact that simple geometries in the first section are able to be obtained through simple and cost-effective (or conventional) manufacturing methods and, on the other hand, that more complex geometries in the second section are able to be obtained by an additive manufacture. In comparison with an additive manufacture of the entire product, the described method offers the advantage that at least the simple geometries of the first section are able to be obtained in a more cost-effective manner. More specifically, it can be avoided, for example, that large volumes of material have to be applied in an additive manner.

A section may be a cohesive region of the product to be manufactured. "Cohesive" means that all parts of the section are connected to one another. However, it is also possible for a section to have a plurality of subsections that are not cohesive. The first section includes all of the parts of the product to be manufactured that are provided according to step a). The second section includes all of the parts of the product to be manufactured that are produced according to step b).

Each subsection may have one or more connection surface(s). For example, a subsection of the first section may be connected to a subsection or to a plurality of subsections of the second section.

The second section is able to be produced using different methods of an additive manufacture, in particular using powder-bed-based methods such as laser-beam melting or buildup welding. In the case of laser-beam melting, a powder of the material of the product to be manufactured is applied in the form of a powder layer on a substrate and locally melted by a laser in a selective manner at the points where the product to be manufactured is to include material. When this process is repeated for a multitude of powder layers, the product to be manufactured is able to be obtained in a layer-wise manner. In the case of buildup welding (also known as cladding), the product to be manufactured is produced from the welding material (i.e. the welding wire or a powder, for instance). The welding material is applied onto a substrate.

In the described method, the at least one first connection surface is used as a substrate for the additive manufacturing process. In an additive manufacture, the finished product is usually removed from the substrate at the end of the manufacturing process. The next product may then be produced on the substrate. In contrast, however, in the described method the second section remains connected to the substrate, i.e. connected to the at least one first connection surface. More specifically, there is no need to connect the second section to the first section after its manufacture. Instead, the second section is produced in such a way that it directly adjoins the first section.

To allow the described method to be applied to a predefined geometry of a product to be manufactured, the product to be manufactured may especially be subdivided into the first section and the second section. In particular, this subdivision can be made when planning the manufacture. For example, a construction drawing is able to be subdivided into the individual sections. The subdivision may particularly be carried out in a virtual manner (e.g., in a construction program of a computer) prior to the actual manufacture.

However, it is also possible to adapt the geometry of the product to be manufactured to the described method. For example, especially the particular regions of the product to be manufactured that are meant to be produced by an additive manufacturing process may be combined. This allows for an especially satisfactory subdivision into the first section and the second section. More specifically, in this way the second section may be given a part geometry that is as optimal as possible for the additive manufacture, which may be the case especially when the second section has a small volume to be built up and/or has few supporting structures. Through a redesign of the component structure of the product to be manufactured, the described method may thus be used in a particularly efficient manner.

In a preferred specific embodiment of the present method, the first section is obtained in step a) by machining a base body.

The base body may in particular be a solid block from which the first section is able to be obtaining by machining, especially by cutting or drilling. The base body is obtainable by a casting method, in particular.

Preferably, the at least one first connection surface is prepared for the additive manufacturing method that is used in step b). For example, a preference is given especially to the specific embodiment of the described method in which the at least one first connection point is developed in the form of a planar surface.

This specific embodiment is particularly well suited to a powder-bed-based additive manufacture of the second section, especially to the laser-beam melting process. This is so because the substrate (i.e. the at least one first connection surface in this case) is preferably a planar substrate, especially in the case of such an additive production method, so that the powder is able to be deposited on the substrate layer by layer.

On the other hand, freely formed connection surfaces are also possible, in particular in the case of buildup welding methods.

In another preferred specific embodiment of the present method, a geometrical complexity of the first section is less than a geometrical complexity of the second section.

The geometrical complexity specifically is an indication of the particular production method by which the respective section is able to be obtained at a given outlay. If the geometrical complexity is low, a manufacture using a casting, forming or machining method is particularly easy. This is the case, for example, when the section to be manufactured includes no complex interior structures or undercuts. Great geometrical complexity may be present especially when a manufacture by casting is impossible or possible only at a great expense (e.g., using complex cores that require precise positioning). Due to the greater geometrical complexity, the second section is produced with the aid of an additive manufacturing process.

Great geometrical complexity is encountered in particular when the respective section includes ducts that have a complex shape and, in particular, have a small diameter and/or a great length. More specifically, great geometrical complexity is present when a section includes ducts featuring a large aspect ratio (i.e. a ratio of length to diameter).

A further specific embodiment of the present method in which at least one duct for a fluid is developed in the second section is therefore particularly preferred.

The duct may especially involve a hydraulic line in a hydraulic component such as a servo directional control valve for a motor vehicle or for a stationary application. In particular, the additive manufacture of the second section may allow for a duct routing that is optimized from the aspect of fluid dynamics. The manufacturing complexity of the first section is not greater in this case. As a result, the first section may have a particularly low geometrical complexity so that the earlier described difficulties, e.g., during the casting of difficult geometries, are able to be avoided. In particular, no ducts featuring a great aspect ratio are preferably provided in the first section. Instead, it is preferred that such ducts are provided in the second section. Ducts of this type in the second section are able to be obtained through the additive manufacturing process.

The geometry of the product to be manufactured may particularly be developed in such a way that regions featuring a high geometrical complexity are situated in such close proximity that they are selectable as the second section. This means that the development of the product to be manufactured is preferably already realized in such a way that the subdivision into the first and the second section is particularly uncomplicated. This may also include a modification of the placement of functional part geometries within a product. A part geometry, for example, may be shifted to the first section, provided this makes sense with regard to the geometrical complexity.

In addition to the conventionally produced part geometry of the first section, where at least one first connection surface is used as a substrate for the additive buildup of the second section, additional regions are able to be produced in the conventional manner and joined at a later point in time. Preference is therefore given to the further specific embodiment of the present method in which the second section includes at least one second connection point for a third section and in which the present method furthermore includes the following method steps:

c) Providing the third section, and d) Connecting the third section to the at least one second connection point of the second section.

The steps a) through d) are preferably carried out in the indicated sequence. However, step c) may also be performed at an earlier point in time.

The third section may be a cohesive region of the product to be manufactured. However, the third section may also have multiple subsections that are not cohesive. The third section encompasses all parts of the product to be manufactured that are provided according to step c) and are connected to the second section according to step d).

The providing of the third section may particularly include the manufacture of the third section. However, it is also possible to use a third section that was manufactured outside the described method.

For example, the third section may be one or more add-on part(s) that is/are connected to the second section in step d) following its manufacture according to step b). The third section may particularly be obtained by casting, forming or machining. The third section preferably has a respective mating piece for each of the second connection surfaces.

The connection of the third section to the second section in step d) may particularly be carried out by gluing using a suitable adhesive, by welding, and/or by a mechanical connection such as with the aid of screws or rivets, for instance.

As described earlier in connection with the subdivision of the product to be manufactured into the first and the second sections, the subdivision of the product to be manufactured into the first, second, and third sections may particularly also be carried out in a virtual manner. A certain predefined product to be manufactured is able to be subdivided in the process. Preferably, however, the design of the product to be manufactured is already adapted to the described method. For instance, especially parts of the product to be manufactured that do not have to be produced in an additive manner but are also unable to serve as a substrate for the additive manufacture may be combined as the third section. For example, a part may not be suitable as a substrate for the additive manufacture if the at least one second connection surface is too small and/or too uneven. Also, based on the geometry of the product to be manufactured, it may be more meaningful not only to combine the parts that are not to be additively manufactured into the first section but to provide a first and a third section instead. For example, this is the case if the second section has two planar surfaces that lie opposite each other and that are adjoined in each case by a part that is not to be additively manufactured. Under these circumstances, it would not be practical to combine the two abutting parts that are not to be additively produced into a first section. An additive manufacture is preferably based on a planar surface as the substrate. It is also possible to base the additive manufacture on a plurality of non-cohesive surfaces. As a minimum, however, it is preferred that the surfaces lie in one plane or at least are positioned at only a slight oblique angle relative to one another. An additive manufacture between two surfaces that lie opposite each other, for example, is not possible or is possible only with great difficulty.

For example, the oil filter may be provided in the first section of the servo directional control valve rather than in the second section, since the receptacle for the oil filter is able to be produced with relatively little effort by a machining process. On the other hand, the additive construction of the oil filter receptacle would mean a considerable measure of material, support structure as well as build-up time and build-up costs.

In contrast to the components that are mounted as add-on parts on manufactured products according to the related art, the third section in particular may have a simple geometry that does not justify an additive construction on account of its low complexity.

In a further, preferred specific embodiment of the present method, the third section is obtained in step c) by machining at least one base body.

The base body may especially be obtained by a casting process. In particular in the event that the third section does not have a cohesive development, a plurality of base bodies may be provided. For example, it is possible to obtain each subsection from a respective base body with the aid of a machining process.

In a further, preferred specific embodiment of the present method, a geometrical complexity of the third section is less than a geometrical complexity of the second section.

Due to the lower geometrical complexity of the third section, it is more advantageous not to use an additive manufacture for its production. Instead, as in the case of the first section, it is possible to use a more advantageous production method such as casting, reshaping or machining.

The geometrical complexity of the second section is preferably greater than the geometrical complexity of the first section and the third section. The additive manufacture is therefore provided only for the second section featuring the particularly high geometrical complexity. The geometrical complexity of the third section may be greater, equal to or less than the geometrical complexity of the first section.

In this particular specific embodiment, the second section has a receptacle as the at least one second connection point, into which a corresponding mating piece of the third section may be inserted. This allows the third section to be positioned in a particularly easy manner for the connection to the second section.

Also to be described here are three-dimensional products that include at least one first section, which has at least one first connection point, and at least one second, additively produced section that adjoins the at least one first connection point.

Such a three-dimensional product may particularly be a hydraulic element, in particular a valve or a pump. It is also possible that such a three-dimensional product forms a part or a section of a valve or a pump.

All additional special advantages and development features described previously in the text in connection with the method for manufacturing are able to be applied and transferred to the three-dimensional products.

Such three-dimensional products may be produced or are produced in particular using the described method for the manufacture. However, it is also conceivable that such three-dimensional products are produced using some other manufacturing method.

Additional details of the present method and the described products and an exemplary embodiment, to which the disclosure is not limited, however, are described in greater detail with the aid of the drawing.

DETAILED DESCRIPTION

Figure 1:
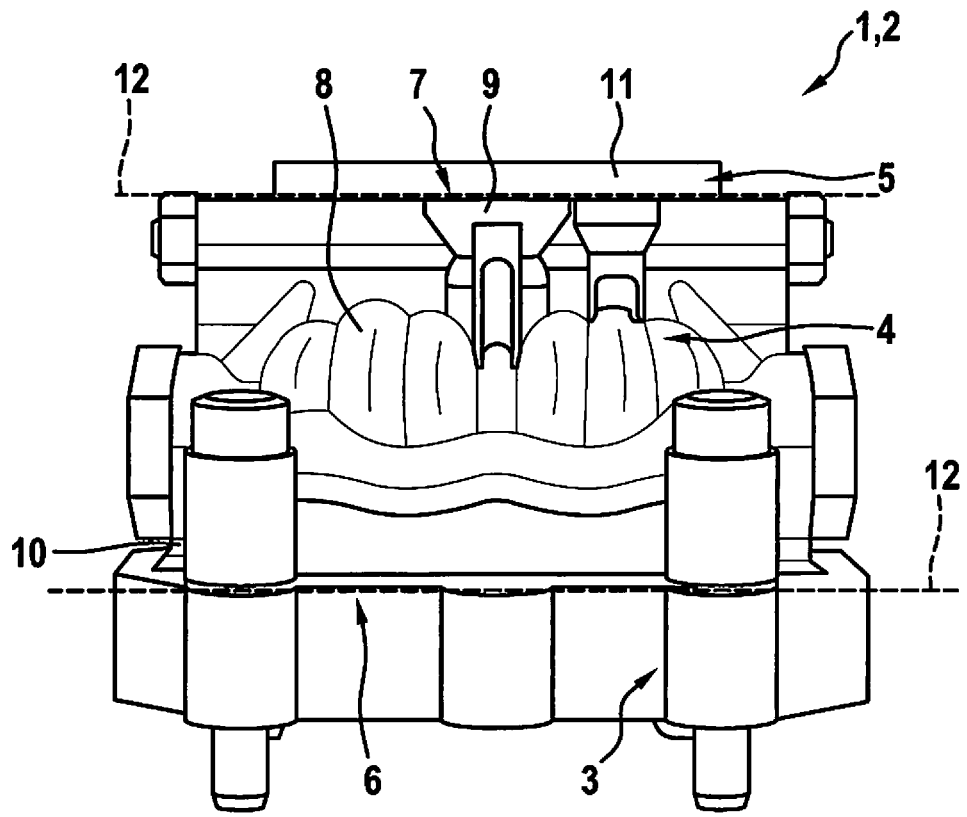
FIG. 1 shows an illustration of a three-dimensional product.

FIG. 1 shows a product 1 to be manufactured, which is a hydraulic element 2, in particular a servo directional control valve in a 4-directional embodiment. Product 1 has a first section 3, a second section 4, and a third section 5. First section 3 is produced by machining. First section 3 has a first connection point 6 via which first section 3 is connected to second section 4. Second section 4 is produced by an additive manufacturing process where first connection point 6 is used as the substrate. Second section 4 has a second connection point 7 via which second section 4 is connected to third section 5. Third section 5 is produced by machining and has then been connected to second connection surface 7. Second connection point 7 has a receptacle 9.

Second section 4 has a greater geometrical complexity than first section 3 and third section 5. This is particularly due to the fact that second section 5 includes a duct 8 for a fluid.

An advantageous selection of separation lines 12 between sections 3, 4, and 5 may allow for the following manufacture, in particular: First of all, first section 3 is produced, which is to be processed by machining. First section 3 has first connection point 6 which has been prepared for the additive manufacturing method. For the powder-bed-based, additive manufacture, first connection point 6 is developed as a planar surface, for instance. Using an additive buildup, the complex part geometry of second section 4 is then produced on first section 3 or on first connection point 6.

In a housing 10 of the servo directional control valve, flanges to the control motor as well as to the hydraulic connection diagram, for example, are thereby able to be produced in third section 5 separately from the rest of the function structure, in particular in first section 3, from the standpoint of complexity. When viewed in isolation, first section 3 and third section 5 are each made up of geometries that are predestined for the conventional processing by machining. The complex function structures, on the other hand, are located in second section 4.

The example of third section 5 makes it clear that a considerable increase in the manufacturing efficiency is possible by the assembly of an upper flange 11 subsequent to the generative manufacturing process, for example. Instead of the complete support of flange 11 in the course of the generative manufacture, only a receptacle 9 for third section 5 needs to be provided as an add-on part. In contrast to the related art, third section 5 is an add-on part that has a simple geometry, which furthermore does not justify an additive buildup due to its low complexity.

Figure 2:
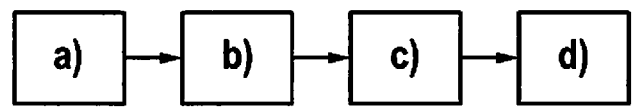
FIG. 2 shows an illustration of a method for manufacturing the product from FIG. 1.

FIG. 2 shows an illustration of a method for manufacturing product 1 from FIG. 1. The described method may not only be transferred to the servo directional control valve shown in FIG. 1 but also to other products and especially to other hydraulic components.

The present method includes the following steps:
a) Providing first section 3 of product 1 to be manufactured, which includes connection point 6 for second section 4 of product 1 to be manufactured;
b) Producing second section 4 by an additive manufacture, in which first connection point 6 of first section 3 is used as a substrate for the additive manufacture of second section 4;
c) Providing third section 5; and
d) Connecting third section 5 to second connection point 7 of second section 4.

Steps a) through d) are carried out in the indicated sequence in this particular example.

What is claimed is:
1. A method for manufacturing a three-dimensional product, comprising:
providing a first section of the product to be manufactured, the first section including at least one first connection point for a second section of the product to be manufactured;
producing the second section by an additive manufacture, the at least one first connection point of the first section being used as a substrate for the additive manufacture of the second section, wherein a geometrical complexity of the first section is less than a geometrical complexity of the second section, and wherein the second section has at least one second connection point for a third section;
providing the third section; and
connecting the third section to the at least one second connection point of the second section;
wherein the first section, the second section, and the third section form at least part of a final, finished three-dimensional product, the final, finished three-dimensional product being a hydraulic element, the hydraulic element being a valve or a pump.

2. The method as recited in claim 1, wherein the first section is obtained by machining a base body.

3. The method as recited in claim 1, wherein the at least one first connection point is developed as a planar surface.

4. The method as recited in claim 1, wherein the hydraulic element is a servo directional control valve.

5. The method as recited in claim 1, further comprising developing at least one duct for a fluid in the second section.

6. The method as recited in claim 1, wherein the third section is obtained by machining at least one base body.

7. The method as recited in claim 1, wherein a geometrical complexity of the third section is less than a geometrical complexity of the second section.

8. The method as recited in claim 1, wherein the at least one second connection point is developed as a receptacle.

9. A three-dimensional product, comprising:
at least one first section that includes at least one first connection point;
at least one second section produced by an additive manufacture and which adjoins the at least one first connection point, wherein a geometrical complexity of the first section is less than a geometrical complexity of the second section, and wherein the second section has at least one second connection point for a third section; and
the third section connected to the at least one second connection point of the second section;
wherein the first section, the second section, and the third section form at least part of a final, finished three-dimensional product, the final, finished three-dimensional product being a hydraulic element, the hydraulic element being a valve or a pump.

10. The three-dimensional product as recited in claim 9, wherein the three-dimensional product is manufactured by:
providing the first section of the product to be manufactured, the first section including the at least one first connection point for the second section of the product to be manufactured; and
producing the second section by the additive manufacture, the at least one first connection point of the first section being used as a substrate for the additive manufacture of the second section, wherein the second section has at least one second connection point for the third section;
providing the third section; and
connecting the third section to the at least one second connection point of the second section.

11. The three-dimensional product as recited in claim 9, wherein the hydraulic element is a servo directional control valve.

\* \* \* \* \*